United States Patent [19]
Nylund

[11] Patent Number: 5,859,886
[45] Date of Patent: Jan. 12, 1999

[54] FUEL ASSEMBLY FOR A BOILING WATER REACTOR

[75] Inventor: Olov Nylund, Västerås, Sweden

[73] Assignee: ABB Atom AB, Västerås, Sweden

[21] Appl. No.: 913,886
[22] PCT Filed: Apr. 9, 1996
[86] PCT No.: PCT/SE96/00454
  § 371 Date: Sep. 25, 1997
  § 102(e) Date: Sep. 25, 1997
[87] PCT Pub. No.: WO96/37895
  PCT Pub. Date: Nov. 28, 1996

[30] Foreign Application Priority Data

May 24, 1995 [SE] Sweden .................................. 9501936

[51] Int. Cl.⁶ ............................... G21C 3/17; G21C 3/32
[52] U.S. Cl. ........................... 376/434; 376/412; 376/371
[58] Field of Search ..................... 376/434, 435, 376/409, 412, 371, 373, 377, 439

[56] References Cited

FOREIGN PATENT DOCUMENTS 0 336 203 10/1989 European Pat. Off. .
0 514 117 11/1992 European Pat. Off. .
0 557 084 8/1993 European Pat. Off. .
0 619 581 10/1994 European Pat. Off. .

Primary Examiner—Charles Jordan
Assistant Examiner—M. J. Lattig
Attorney, Agent, or Firm—Pollock, Vande Sande & Priddy

[57] ABSTRACT

A fuel assembly for a boiling water reactor comprises a bottom tie plate, a top tie plate, and a first and a second group of vertical fuel rods, each including a column of fuel pellets surrounded by a cladding tube. The second group of fuel rods has a shorter active length than the first group of fuel rods. Both the first and the second group of fuel rods extend between the bottom tie plate and the top tie plate. The second group of fuel rods comprises a fission gas plenum surrounded by a plenum tube arranged above the cladding tube. The main part of the plenum tube has a cross-section area which is smaller than the cross-section area of the cladding tube.

8 Claims, 5 Drawing Sheets

FUEL ASSEMBLY FOR A BOILING WATER REACTOR

TECHNICAL FIELD

The present invention relates to a fuel assembly for a boiling water reactor comprising a bottom tie plate, a top tie plate, a first and a second group of vertical fuel rods, each comprising a column of fuel pellets surrounded by a cladding tube, wherein the second group of fuel rods has a shorter active length than the first group of fuel rods. The active length of a fuel rod means the height of the column of fuel pellets.

BACKGROUND OF THE INVENTION

A core in a nuclear reactor comprises a plurality of vertically arranged fuel assemblies. A fuel assembly comprises one or more fuel bundles. A fuel bundle comprises a plurality of vertical fuel rods arranged between a bottom tie plate and a top tie plate. The fuel rods contain a column of circularly cylindrical pellets of a nuclear fuel arranged in a cladding tube. At the bottom of the fuel rods, a bottom plug is arranged for insertion into holes provided therefor in the bottom tie plate, and at the top of the fuel rods, a top plug is arranged for insertion into holes provided therefor in the top tie plate. A small number of so-called supporting fuel rods retain the fuel bundle and are fixed to the bottom tie plate and the top tie plate. The fuel bundles or the fuel bundle are/is surrounded by a fuel channel which is normally designed with a square cross section.

During the burnup of the nuclear fuel, fission gases, which are contained within the fuel rod, are released. To prevent the pressure on the cladding from becoming too large, an expansion space is needed for the fission gases, a so-called fission gas plenum. The fission gas plenum should correspond to 5–10% of the volume of the fuel. For a fuel rod whose diameter is substantially constant and whose active length is 4 m, this means that the fission gas plenum should be 0.2–0.4 m. In full-length fuel rods, the fission gas plenum is arranged in the upper part thereof, above the reactor core, and hence exerts a minimum influence on the efficiency of the reactor. The active length of a fuel rod is the length of that part of the fuel rod which contains fuel pellets and does not comprise a fission gas plenum.

The core is immersed into water which serves both as coolant and as neutron moderator. During operation, part of the water changes into steam. At the lower part of the fuel assembly, there is only water, but the higher up in the fuel assembly, the higher the percentage of steam. When the percentage of steam rises, the neutron moderation deteriorates since steam is inferior to water as moderator. The reactivity of the reactor depends on the ratio between fuel and moderator. To improve the reactivity, the water/steam ratio in the upper part of the fuel assembly must be increased.

One way of obtaining a higher water/fuel ratio in the upper part of the fuel assembly is to replace the majority of the fuel rods with fuel rods which are tapering in an axial direction. The General Electric patent application EP-0 514 121 A1 discloses a fuel rod which comprises a lower column of fuel pellets with a relatively larger diameter, and an upper column of fuel pellets with a relatively smaller diameter and a cladding tube, which comprises a lower coarser part which surrounds the lower column of fuel pellets, an upper narrower part which surrounds the upper column of fuel pellets, and a transition portion between the lower and upper parts. The fuel rod described in the above EP publication has two fission gas plenums, one in the upper part of the fuel rod and one in the lower part of the fuel rod.

To obtain an optimum fuel-to-moderator ratio with tapering fuel rods, all or at least the majority of the fuel rods should consist of tapering fuel rods. The disadvantage of tapering fuel rods is that it is expensive to manufacture fuel pellets with two different diameters and tapering cladding tubes compared with ordinary fuel rods of uniform thickness where all the fuel pellets have the same diameter and the cladding tube is straight. Since the majority of the fuel rods consist of tapering fuel rods, the total cost of the fuel assembly is high.

Another method of reducing the fuel quantity in the upper part of a fuel assembly is to replace some of the fuel rods with part-length fuel rods. Part-length fuel rods have a shorter axial extent than traditional full-length fuel rods. Patent document EP-0 336 203 B1 discloses a fuel assembly in which the majority of the fuel rods are full-length fuel rods, that is, they extend from the bottom tie plate to the top tie plate, and a minority of the fuel rods are part-length rods, that is, they extend from the bottom tie plate towards the top tie plate but terminate somewhat below the top tie plate. In order to retain the part-length rods, they are fixed to the bottom tie plate. The fixing can be made by providing the bottom plug with threads and screwing it to the bottom tie plate.

Inspection and service of the fuel assemblies are performed at regular intervals, among other things to detect and correct fuel damage as early as possible to prevent extensive leakage of fuel and fission products. The inspection and the service take place in a special pool to which the fuel assemblies have been moved. The fuel assemblies are only accessible from above so the fuel rods have to be lifted from above. The non-supporting full-length fuel rods can be easily lifted up since they are not fixed to the bottom tie plate. The fuel rods which are fixed to the bottom tie plate must be loosened therefrom, which may entail complications, especially when the fuel assembly becomes older and the bond may start jamming. A further problem which arises when the part-length fuel rods are to be lifted up is that it is difficult to reach them and to engage from above. Therefore, specially constructed tools are required to lift out the part-length fuel rods.

The above-mentioned EP application (EP-0 336 203 B1) discloses a part-length fuel rod which has been provided with an extension in the form of a screwed vane (swirl vane) which throws water droplets to the sides so that they hit adjacent fuel rods. In this way, an improved dryout margin is obtained. To attain an increase of the dryout margin, it is sufficient for the swirl vane to extend along the active length of the other fuel rods.

To obtain an optimum water/fuel ratio in the fuel assembly, the fuel column in a part-length fuel rod should have a certain optimum height. The optimum height of the fuel column may be obtained by calculations. A problem with part-length fuel rods is where to place fission gas plenums to give a minimum influence on the efficiency of the reactor. The above-mentioned EP application (EP-0 336 203 B1) discusses this problem in column 18, lines 52–58, and column 19, lines 5–22. One way is to arrange fission gas plenums in the upper part of the part-length fuel rods, that is, above the optimum height of the fuel column. However, placing fission gas plenums in the upper part of the part-length fuel rod entails several considerable drawbacks. One drawback is that part of the volume which could have been filled with a moderator cannot be utilized, and this in a region where moderators are already an in short supply. This solution also provides a number of relatively large fuel- and moderator-free volumes centrally in the core, which is not good, either from the neutron point of view, or from the efficiency point of view. As a better solution to the problem it is proposed that the whole, or at least a part of, the fission gas plenum should be placed at the bottom of the fuel rod. A disadvantage with this solution is that the total fuel quantity in the fuel rod decreases by 5–10%, which leads to an undesired reduction in efficiency.

THE SUMMARY OF THE INVENTION

The invention aims to provide a fuel assembly of the kind described in the introductory part of the description, which is easy to detach during inspection and service of the fuel assembly, is relatively inexpensive to manufacture, has an optimum water/fuel ratio, and the fission gas plenums of which are arranged so as to exert the least possible influence on the efficiency of the reactor.

By making the plenum part sufficiently narrow, it is sufficient with a small number of fuel rods with a reduced active length to achieve an optimum water/fuel ratio in the upper part of the fuel assembly. Since the majority of the fuel rods are ordinary fuel rods of uniform thickness, the price of the fuel assembly can be kept low.

Because all the fuel rods in the fuel assembly are of the same length, it is easy to lift the fuel rods out of the fuel assembly for inspection and service. To lift the fuel rods, no special tools or any extra step are necessary compared with lifting traditional fuel rods.

By extending the fission gas plenum in the longitudinal direction of the fuel rod, a large fuel- and moderator-free volume is prevented from being formed centrally in the fuel assembly. Since no fission gas plenum is needed at the bottom of the fuel rod, almost the entire height in the fuel part may be utilized for fuel pellets, which increases the efficiency of the fuel assembly.

BRIEF DESCRIPTION OF THE DRAWINGS

The invention will be described in greater detail in the following with reference to the accompanying drawings, which show as an example an advantageous embodiment of a fuel assembly according to the invention.

DETAILED OF THE PREFERRED EMBODIMENTS

Figure 1:
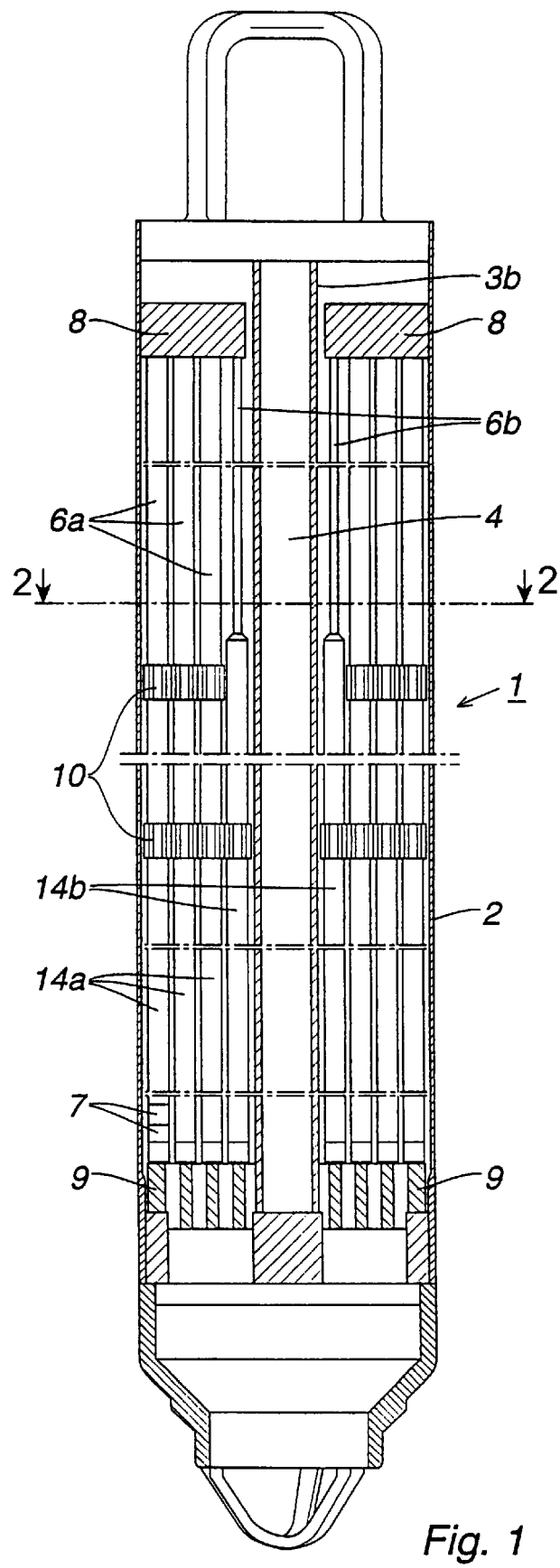
FIG. 1 schematically shows one embodiment of a fuel assembly according to the invention in a section through the line 1—1 in FIG. 2.
Figure 2:
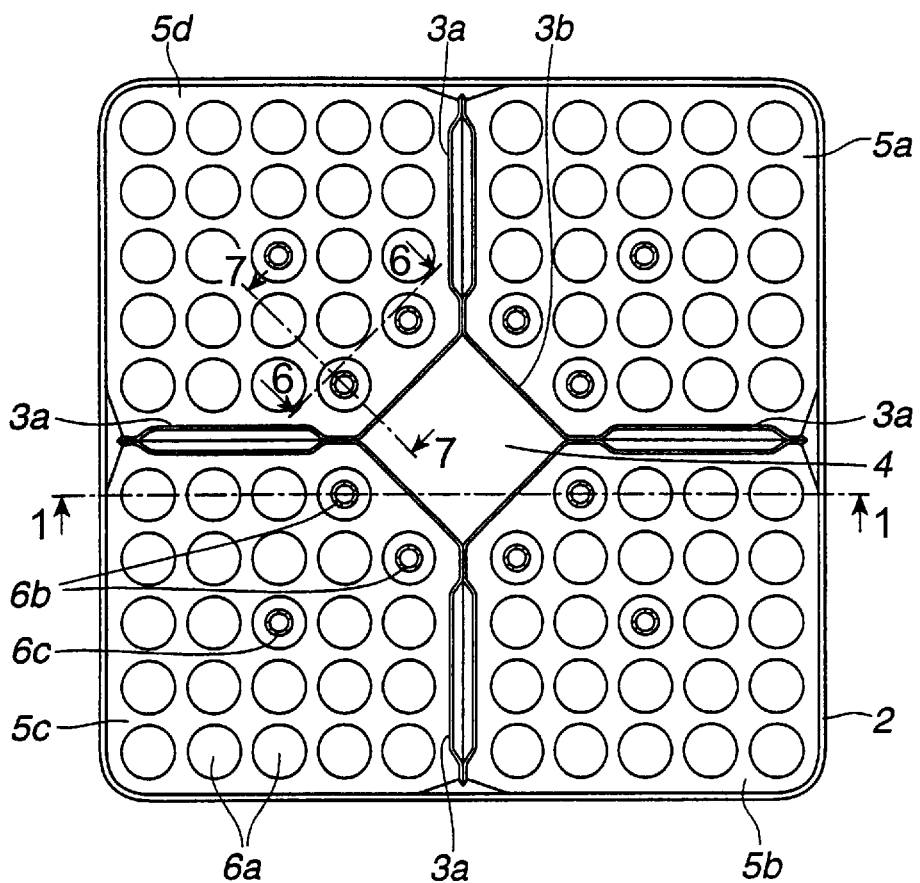
FIG. 2 shows the fuel assembly in FIG. 1 in a view perpendicular to a horizontal plane through the line in FIG. 1.

FIGS. 1 and 2 show a boiling-water fuel assembly 1 which comprises a long tubular container with a rectangular cross section, referred to as a cladding tube 2. The cladding tube 2 is open at both ends to form a continuous flow passage, through which water flows. The cladding tube 2 is provided with a hollow support means 3a, 3b of cruciform cross section, which is secured to the four walls of the fuel channel. The support means consist of four hollow wings 3a and a hollow enlarged cruciform center 3b. The support means 3a, 3b form a vertical channel 4 through which non-boiling water flows upwardly through the fuel assembly. The fuel channel with support means surround four vertical channel-formed parts 5a–5d, so-called sub-channels, with a substantially square cross section. Each sub-channel contains a fuel bundle comprising a plurality of fuel rods 6a, 6b and 6c arranged in parallel. A fuel rod comprises a number of cylindrical pellets 7 of uranium dioxide, stacked on top of each other and enclosed in a cladding tube 14a, 14b.

The fuel rods are arranged in a symmetrical 5×5 lattice in which all the fuel rod positions except one are occupied by fuel rods. The fuel rods are of two different types, namely, fuel rods 6a of uniform thickness, the diameter of which is substantially constant along the whole of its vertical length, and tapering fuel rods 6b, 6c with a reduced active length. All the fuel rods in a fuel bundle are retained at the top by a top tie plate 8 and at the bottom by a bottom tie plate 9. The fuel rods 6a, 6b, 6c are kept spaced apart from each other by means of spacers 10 and are prevented from bending or vibrating when the reactor is in operation. The spaces between the fuel rods within each sub-channel are traversed by water and steam. Each fuel bundle comprises two tapering fuel rods with a reduced active length 6b, which are arranged adjacent to each other and close to the cruciform center 3b of the support means, and one tapering fuel rod with a reduced active length 6c which is surrounded by fuel rods 6a of uniform thickness.

Figure 3:
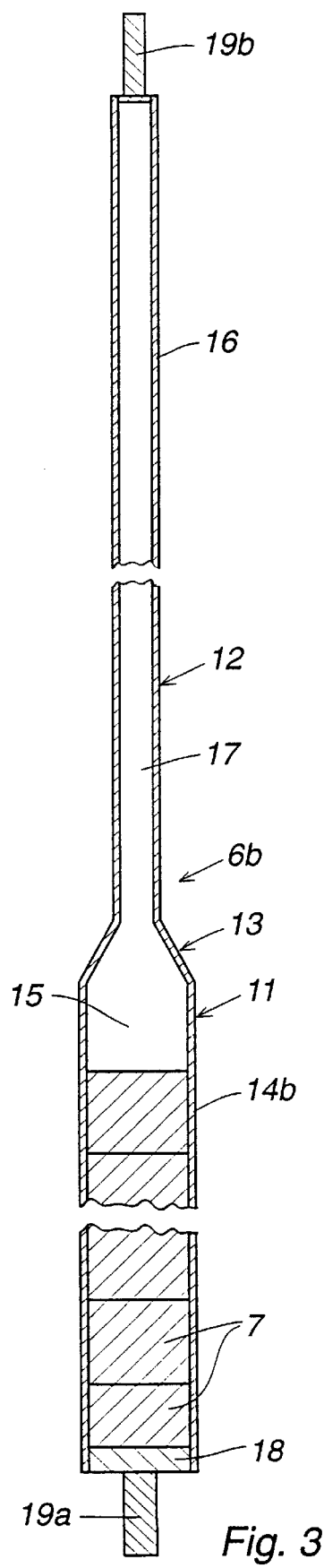
FIG. 3 schematically shows an embodiment of a fuel rod with a reduced active length according to the invention.

FIG. 3 shows a tapering fuel rod with a reduced active length 6b in cross section. The fuel rod 6b comprises a fuel part 11, a plenum part 12, a transition portion 13 between the fuel part and the plenum part, a bottom plug 19a for attachment to the bottom tie plate, and a top plug 19b for attachment to the top tie plate. The fuel part 11 is arranged in the lower part of the fuel rod and comprises a cladding tube 14b which surrounds a column of fuel pellets 7. Above the fuel pellets there is a short space 15 which allows the fuel pellets to expand because of thermal expansion and irradiation growth.

The plenum part 12 comprises a hollow plenum tube 16, the diameter of which is considerably smaller than the diameter of the cladding tube. The diameter of the plenum tube is preferably smaller than two-thirds of the diameter of the cladding tube. The plenum tube is closed at its upper end. The fission gas plenum 17 consists of the space which is surrounded by the plenum tube 16. The transition portion between the plenum part and the fuel part is open to allow the fission gases formed in the fuel pellets to pass from the fuel part to the fission gas plenum. The lower part of the cladding tube is sealed by a bottom plug 18. The plenum part constitutes about one-third of the total length of the fuel rod. To increase the strength and the stiffness of the plenum tube, it is suitable for the plenum tube to have a larger thickness than the cladding tube.

Figure 4:
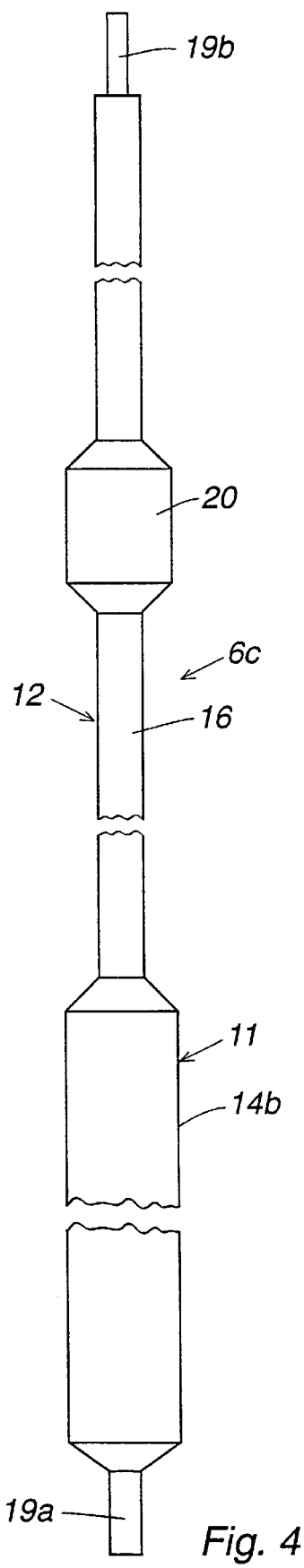
FIG. 4 schematically shows another embodiment of a fuel rod with a reduced active length.

The spacers 10 are provided with a plurality of openings corresponding to the number of fuel rods 6a and 6c in the fuel bundle. When the fuel rods are passed into or out of the fuel assembly, they are moved through these openings. All the spacer holes have the same diameter irrespective of whether the thickness of the associated fuel rod is uniform 6a or tapering 6c. FIG. 4 shows a tapering fuel rod 6c with a reduced active length. It has the same construction as the fuel rod 6b in FIG. 3 and comprises, in addition, a number of support sleeves 20 arranged on the plenum tube on a level with the spacers. The support sleeves 20 have a diameter corresponding to the diameter of the cladding tube and the task of these sleeves is to fit into the spacer holes, thus providing support for the fuel rod against the spacers. The support sleeves may be designed in different ways.

Figure 5:
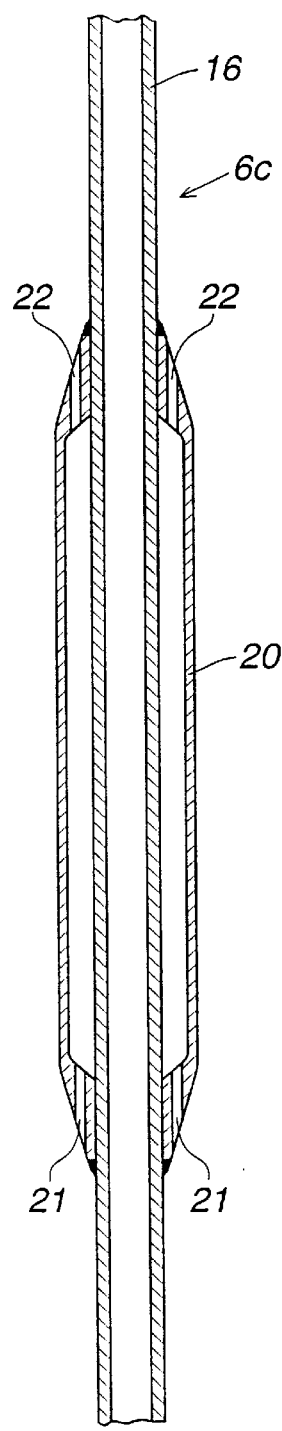
FIG. 5 shows an example of a supporting sleeve.
Figure 6:
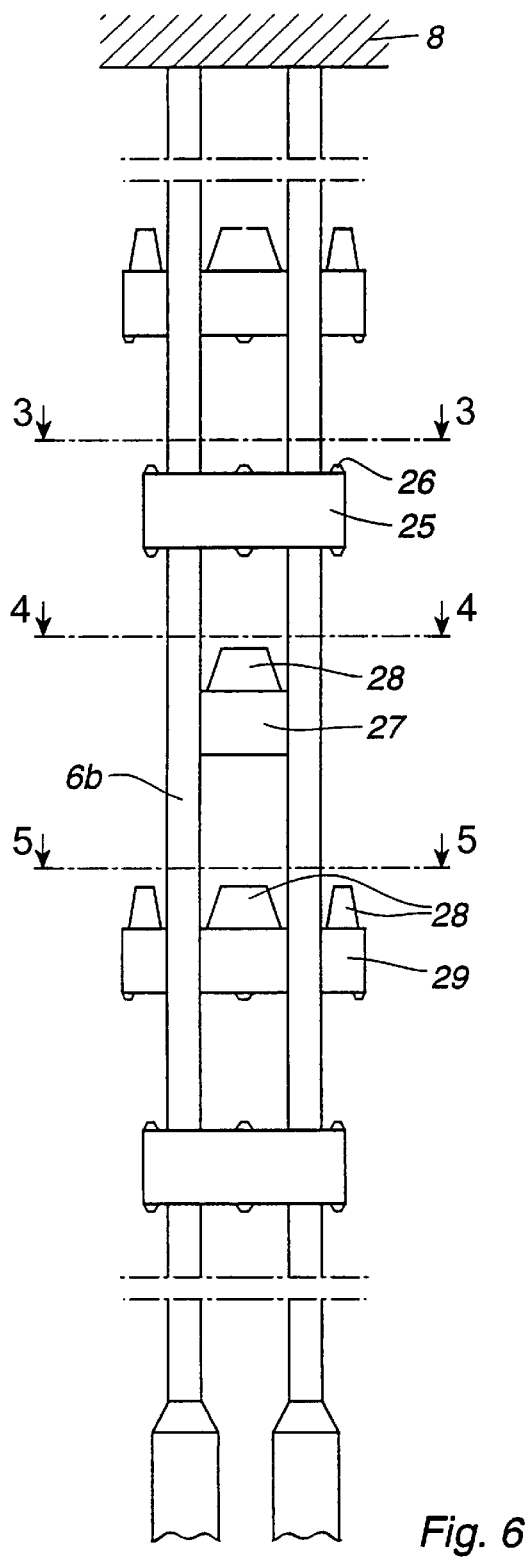
FIG. 6 shows in more detail part of the fuel assembly according to the invention in a section through the line 6—6 in FIG. 2.
Figure 7:
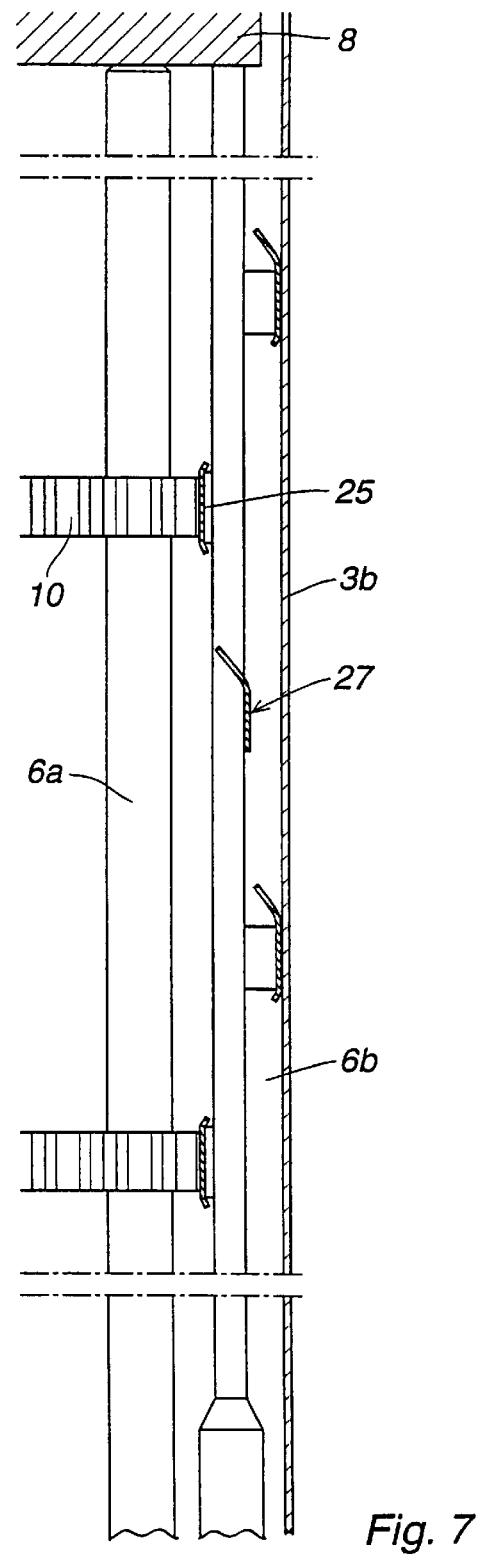
FIG. 7 shows a section through the line 7—7 in FIG. 2.
Figure 8A:
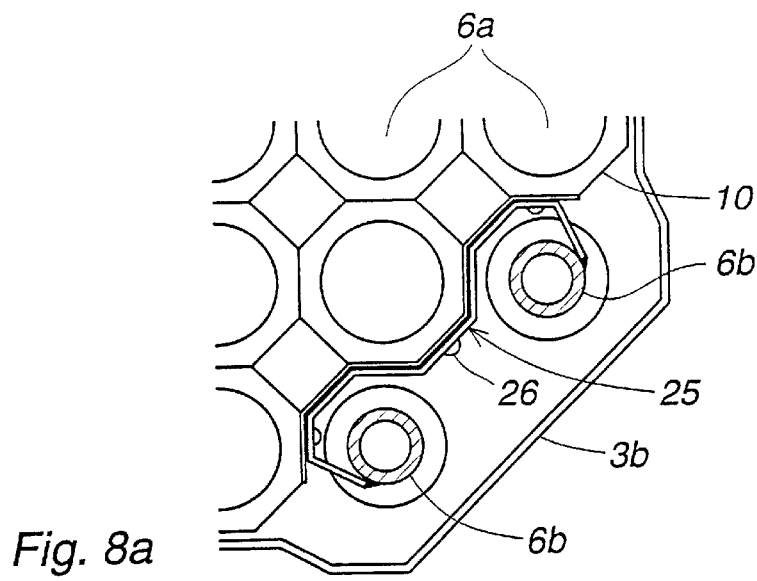
FIG. 8a shows a section through the line 3—3 in FIG. 6.
Figure 8B:
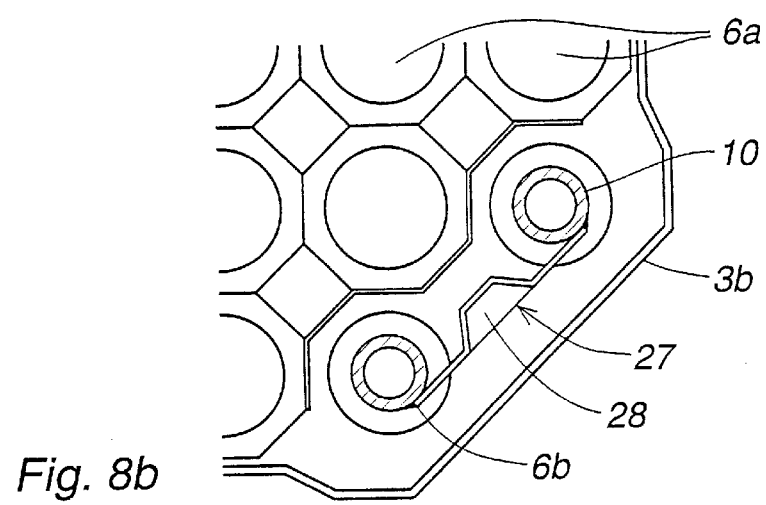
FIG. 8b shows a section through the line 4—4 in FIG. 6.
Figure 8C:
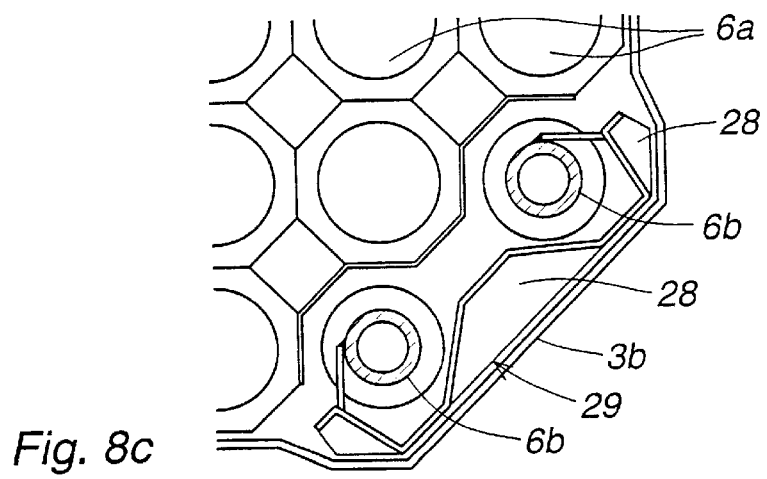
FIG. 8c shows a section through the line 5—5 in FIG. 6

FIG. 5 shows an example of a support sleeve 20, the lower end of which is provided with inlet holes 21 and the upper end of which is provided with outlet holes 22, allowing water to flow through the support sleeve.

One problem with a fuel rod with one long and one narrow plenum part is that it is not as stiff in its upper part as a fuel rod of uniform thickness. This can be solved, for example, with shorter distances between the spacers or with intermediate spacers between the ordinary spacers. FIGS. 6, 7 and 8a–8c show a solution wherein two adjacent tapering fuel rods are joined together by means of cross bars. The task of the cross bars is to support and reinforce the fuel rods. They may also be designed to direct the water flow and thus reduce the risk of dryout in the fuel bundle. The cross bars may be welded directly to the fuel rods, or be welded to sleeves which are then fitted over the fuel rods and locked axially.

FIGS. 6, 7 and 8a–8c show three different types of cross bars 25, 27, 29. On a level with a spacer 10, a cross bar 25 is arranged which connects two tapering fuel rods 6b and at the same time provides support against the spacer 10. In these positions, the spacer 10 has an opening which corresponds to two rods so that the rods may be freely pulled upwardly. The cross bar 25 is provided with guiding tabs 26 which prevent the cross bars from hooking onto the spacers when the fuel rods are passed out of or into the fuel assembly. The cross bar 27 connects two tapering fuel rods. The cross bar 29 connects two tapering fuel rods while at the same time providing support against the support member 3b. The cross bars 27 and 29 are provided with deflection vanes 28 which deflect the flow of water and hence improve the dryout margin.

To obtain the advantages of the invention, the main part of the plenum part should have a cross-section area which is smaller than half of the cross-section area in the fuel part. Preferably, the main part of the plenum part should have a cross-section area which is about one-third of the cross-section area of the fuel part. By cross-section area it is meant the total cross-section area, that is, the cross-section area which corresponds to the outside diameter of the plenum tube and the cladding tube, respectively. The plenum part should also take up more than 20% of the total length of the fuel rod to provide the above-mentioned advantages.

The active length of fuel rods with a reduced active length is preferably less than 80% of the active length of the other fuel rods in the fuel assembly. In another embodiment, the plenum part, preferably in its upper part, may comprise a part whose cross-section area is larger than the cross-section area in the remainder of the plenum part.

I claim:

1. A fuel assembly for a boiling water reactor comprising a bottom tie plate, a top tie plate, a first and a second group of vertical fuel rods, each comprising a column of fuel pellets surrounded by a cladding tube, wherein the second group of fuel rods has a shorter active length than the first group of fuel rods, and wherein both the first and the second group of fuel rods extend between the bottom tie plate and the top tie plate, the second group of fuel rods comprises a fission gas plenum surrounded by a plenum tube arranged above the cladding tube, and the main part of the plenum tube has a cross-section area which is smaller than the cross-section area of the cladding tube.

2. A fuel assembly according to claim 1, wherein the main part of the plenum tube has a cross-section area which is smaller than half of the cross-section area of the cladding tube.

3. A fuel assembly according to claim 1, wherein the main part of the planum tube has a cross-section area which is smaller than 40% of the cross-section area of the cladding tube.

4. A fuel assembly according to claim 1 wherein the active length of the second group of fuel rods is smaller than 80% of the active length of the first group of fuel rods.

5. A fuel assembly according to claim 1 wherein the fission gas plenum of the second group of fuel rods constitutes at least 20% of the total height of the fuel rod.

6. A fuel assembly according to claim 1 wherein the fission gas planum of the second group of fuel rods constitutes at least 30% of the total height of the fuel rod.

7. A fuel assembly according to claim 1, further comprising a spacer for keeping the fuel rods spaced apart from each other, and wherein a fuel rod from the second group comprises a support sleeve arranged on the plenum tube to be in contact with the spacer.

8. A fuel assembly according to claim 1 wherein two adjacently located fuel rods from the second group are joined together by cross bars arranged on the plenum tube.

* * * * *